F. J. HARVEY.
AUTO LOCK.
APPLICATION FILED JAN. 17, 1919.

1,341,055.

Patented May 25, 1920.

WITNESS

INVENTOR
Frank J. Harvey.
BY Orwig & Beir, ATTYS ated May 25, 1920.

UNITED STATES PATENT OFFICE.

FRANK J. HARVEY, OF DES MOINES, IOWA.

AUTO-LOCK.

1,341,055.

Specification of Letters Patent.

Patented May 25, 1920.

Application filed January 17, 1919. Serial No. 271,727.

*To all whom it may concern:*

Be it known that I, FRANK J. HARVEY, a citizen of the United States, and a resident of Des Moines, in the county of Polk and State of Iowa, have invented a certain new and useful Auto-Lock, of which the following is a specification.

The object of my invention is to provide a lock for locking the crank handle of an automobile against movement for thereby preventing theft; said lock being of extremely simple and inexpensive and durable construction and being adapted to be quickly and easily mounted on or removed from the automobile.

With this and other objects in view my invention consists in the construction, arrangement and combination of the various parts of the device, whereby the objects contemplated are attained, as hereinafter more fully set forth, pointed out in my claim and illustrated in the accompanying drawings, in which:

Figure 1:
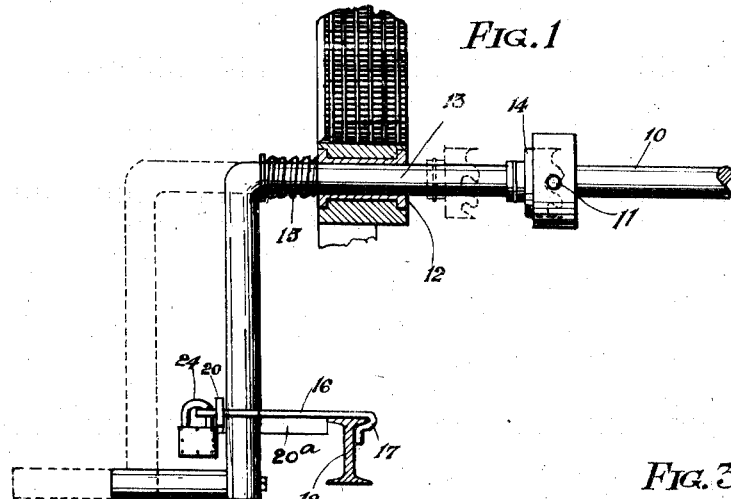
Figure 1 shows a side elevation of a portion of an engine shaft and crank handle equipped with a lock embodying my invention, the bearing for the crank handle and the axle of the automobile being shown in section.

In the accompanying drawings I have used the reference numeral 10 to indicate generally the engine shaft of a motor vehicle, having on one end a clutch member 11. Slidably mounted in a suitable bearing 12 is a horizontal portion of a crank handle 13 having on one end a coacting clutch member 14.

The crank handle has mounted thereon a spring 15 for normally holding the clutch members out of engagement with each other.

My improved lock comprises a flat plate 16 having at one edge a channel-shaped portion 17. The plate 16 is designed to rest above the axle 18, and the channel-shaped portion 17 engages a portion of the axle, as illustrated in Fig. 1.

At the opposite end of the flat plate 16 from the channel-shaped member 17 is a centrally arranged notch 19.

Pivotally secured to the portion of the plate 16 at one side of the notch 19 is a lock member 20 which is pivoted by means of a pintle 21.

Figure 3:
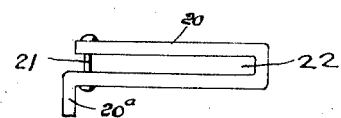
Fig. 3 shows a front elevation of the hinged member of the lock.
Figure 2:
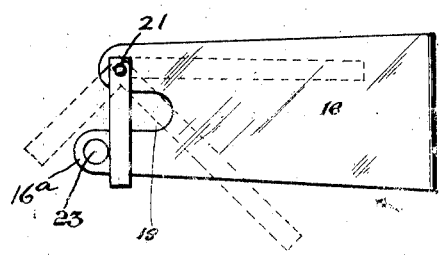
Fig. 2 shows a top or plan view of my improved lock.

The lock member 20 comprises a substantially U-shaped laterally opening device having its arms pivoted to the plate 16 near one side thereof at the end farthest removed from the flange 17, as illustrated in Figs. 2 and 3. Extending away from the front end of the lower arm of the lock member 20, substantially at right-angles thereto, is an arm $20^a$ the function of which will be hereinafter more fully explained. The flange 16 has an extended portion $16^a$ in which is an opening 23 designed to receive the shackle of the lock 24.

In the practical use of my improved lock, the plate 16 is placed above the axle 18 with a portion of the upper flange of the axle projecting into the channel 17, as illustrated in Fig. 1. The crank handle is then forced toward the shaft 10 until the clutch members engage. The plate 16 is of such shape that when the clutch members are engaged the downward projecting portion of the crank handle will be received in the notch 19, as illustrated in Fig. 1.

The lock member 20 is then swung around to position where the slot 22 receives a part of the plate 16 and the padlock is installed in position.

It will be seen that the crank handle will then be locked to the axle and that the machine cannot be cranked, nor can the engine be turned over until the lock is released.

The arm $20^a$ is so arranged that when the lock member 20 is in locked position, for holding the crank as illustrated in Fig. 1, the arm $20^a$ will have its free end adjacent to the axle 18, as illustrated in Fig. 1, and as illustrated by the upper dotted lines in Fig. 2.

When, however, the lock member 20 is moved to open position the arm $20^a$ moves away from the axle to its position shown by the lower dotted lines in Fig. 2.

The arm or flange $20^a$ prevents any springing of the crank which might otherwise permit the removal of the flanged end of the plate 16 from the axle.

My lock is of very simple construction and can be made at a slight expense.

It can be stored in a tool box or any convenient place when not in use and may be quickly and easily installed on the car or removed therefrom.

When installed it will afford protection against theft.

I claim as my invention:

In a device of the class described; a detachable starting crank lock comprising a substantially horizontal plate, having at its rear end a curved portion adapted to receive and grip the rear upper part of an axle; said plate having a notched portion designed to receive a crank, and a portion provided with an opening for receiving a lock, a locking bar pivoted near one side of said plate having a notch designed to project over the other side of said plate, and to be locked against removal therefrom, by a lock device projected through said lock receiving opening. said locking bar having an arm designed when the arm in is locking position to extend rearwardly and engage an axle for preventing the removal of said plate therefrom, and designed when the locking bar is moved to unlocked position to swing away from the axle.

Des Moines, Iowa, December 9, 1918.

FRANK J. HARVEY.